(12) United States Patent
Izumi

(10) Patent No.: US 7,110,791 B2
(45) Date of Patent: Sep. 19, 2006

(54) COMMUNICATION APPARATUS CAPABLE OF COMMUNICATING VIA DIFFERENT TYPES OF COMMUNICATION LINES AND CONTROL METHOD THEREOF

(75) Inventor: Michihiro Izumi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 11/030,070

(22) Filed: Jan. 7, 2005

(65) Prior Publication Data

US 2005/0124384 A1 Jun. 9, 2005

Related U.S. Application Data

(62) Division of application No. 09/925,639, filed on Aug. 10, 2001, now Pat. No. 6,909,909.

(30) Foreign Application Priority Data

Aug. 31, 2000 (JP) ............................. 2000-262650

(51) Int. Cl.
*H04M 1/00* (2006.01)
(52) U.S. Cl. ................. 455/557; 455/556.1; 455/552.1; 455/575.1; 358/471
(58) Field of Classification Search ................. 455/557, 455/556.1, 575.1, 426.2, 552.1, 41.2, 450, 455/509; 358/471–473; 370/337, 347; 379/100.1
See application file for complete search history.

(56) References Cited

U.S. PATENT DOCUMENTS

| | | | | |
|---|---|---|---|---|
| 4,837,812 A | | 6/1989 | Takahashi et al. ....... 397/93.07 |
| 5,172,243 A | | 12/1992 | Hayashi et al. ............. 358/400 |
| 5,448,593 A | * | 9/1995 | Hill ............................. 375/267 |
| 5,519,763 A | * | 5/1996 | Namekawa et al. ..... 455/556.1 |
| 5,680,633 A | * | 10/1997 | Koenck et al. ........ 235/472.02 |
| 5,825,505 A | | 10/1998 | Toyoda et al. ............... 358/400 |
| 6,128,510 A | | 10/2000 | Beukema et al. ........... 455/557 |
| 6,246,489 B1 | | 6/2001 | Park ........................... 358/442 |
| 6,288,800 B1 | | 9/2001 | Izumi ......................... 358/468 |
| 6,295,461 B1 | | 9/2001 | Palmer et al. .............. 455/557 |
| 6,615,049 B1 | | 9/2003 | Yang .......................... 455/462 |

(Continued)

FOREIGN PATENT DOCUMENTS

JP 10-224591 A 8/1998

*Primary Examiner*—Joseph Feild
*Assistant Examiner*—Kamran Afshar
(74) *Attorney, Agent, or Firm*—Fitzpatrick, Cella, Harper & Scinto

(57) ABSTRACT

To provide an communication apparatus such as a facsimile apparatus that allows radio communication in different modes to be used so that efficient communication can be implemented. For instance, even in a state where the image reading section (hand scanner) is removed, it allows an image read by the facsimile apparatus to be sent to another first terminal and simultaneously radio-communicated to a public switched line by a second terminal by way of the facsimile apparatus. Also, it allows a quality cordless telephone function to be implemented by a TDMA radio line and simultaneously high-speed transmission of image data and so on to be implemented by a frequency hopping radio line. The communication apparatus according to the present invention is characterized by concurrently using a radio communication line such as TDMA of which transmission band is guaranteed to be used although its transmission speed is not fast as exemplified by PHS and a radio communication line such as frequency hopping that has a possibility of interference occurring in the transmission band although its transmission speed is fast as exemplified by Bluetooth.

3 Claims, 8 Drawing Sheets

IC1: IMAGE COMMUNICATION SYSTEM

U.S. PATENT DOCUMENTS 6,785,748 B1    8/2004  Mikuni et al. ................ 710/15
2002/0034965 A1  3/2002  Hirai et al. ................ 455/557
2002/0039194 A1  4/2002  Nakao et al. ............... 358/1.14

* cited by examiner

FREQUENCY HOPPING RADIO LINE FRAME DIAGRAM

TDMA RADIO LINE FRAME DIAGRAM

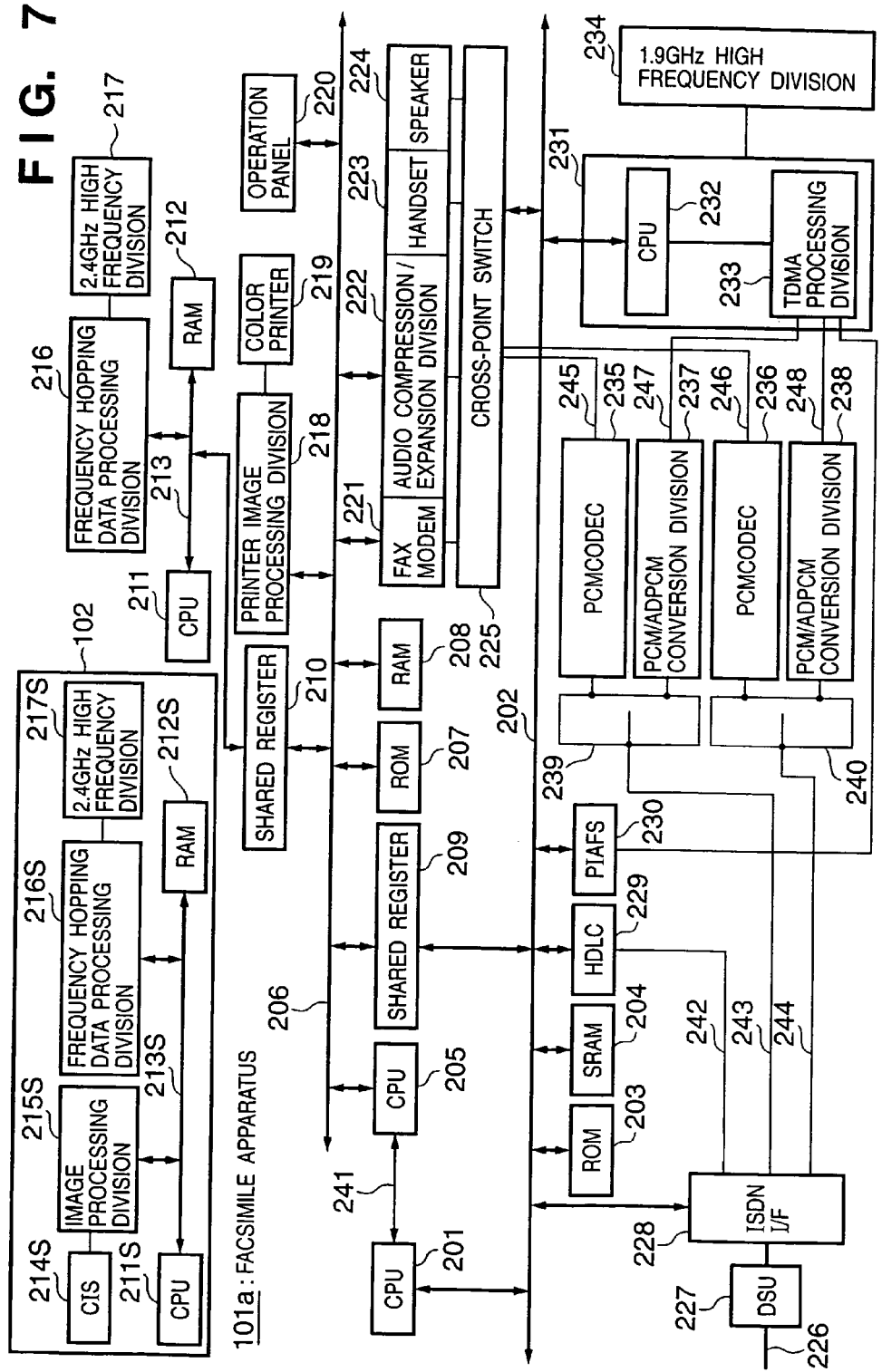

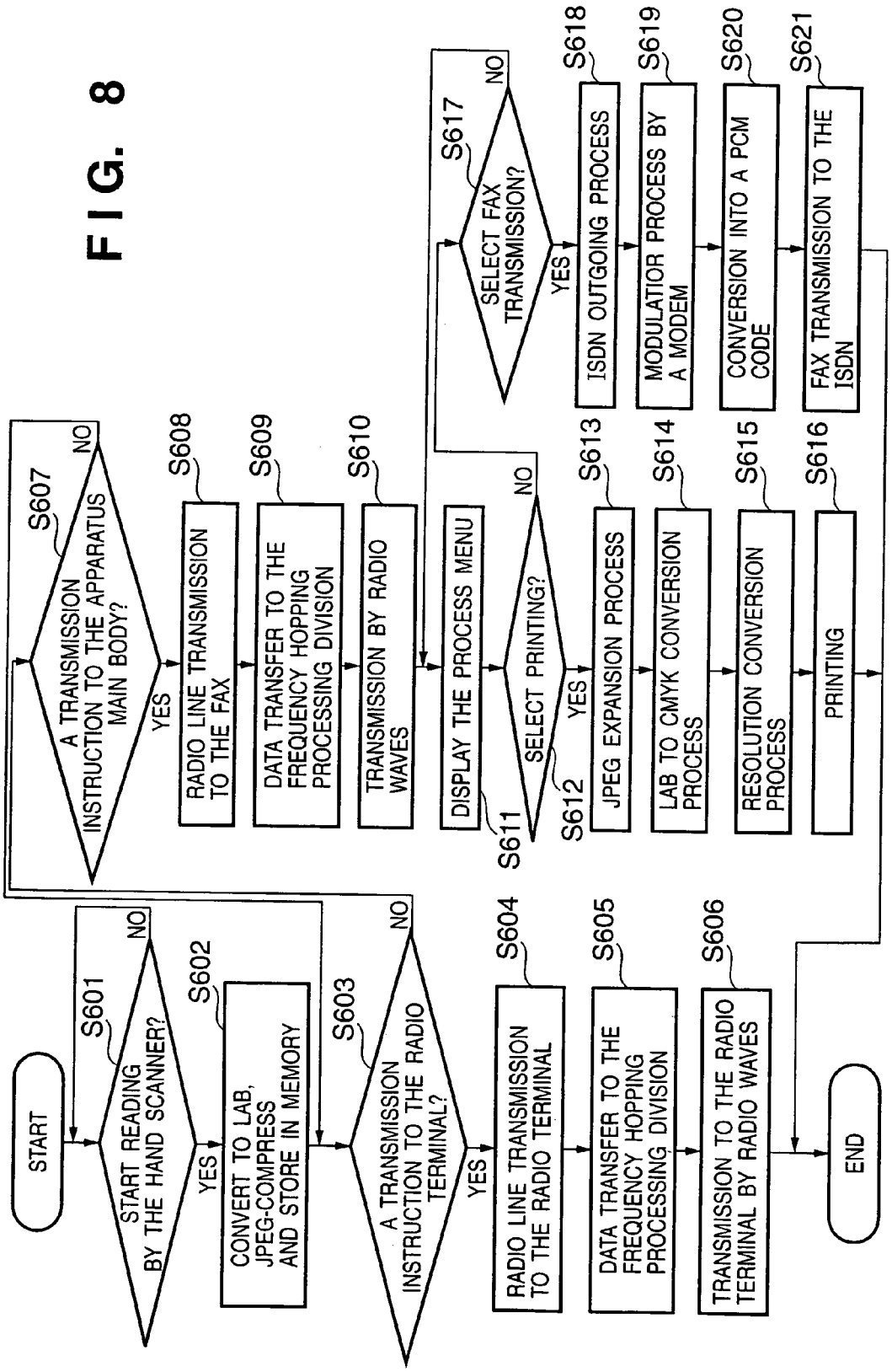

COMMUNICATION APPARATUS CAPABLE OF COMMUNICATING VIA DIFFERENT TYPES OF COMMUNICATION LINES AND CONTROL METHOD THEREOF

RELATED APPLICATION

This application is a division of application Ser. No. 09/925,639, filed on Aug. 10, 2001, now U.S. Pat. No. 6,909,909 the entire disclosure of which is incorporated herein by reference.

FIELD OF THE INVENTION

The present invention relates to a communication apparatus capable of radio communication of different modes such as TDMA (Time Division Multiple Access) mode used in PHS (PersonalHandy-phoneSystem) and so on and FH (Frequency Hopping) mode used in Bluetooth and so on.

BACKGROUND OF THE INVENTION

In recent years, development of radio communication technologies have advanced to the extent that products wherein a radio communication function is added to a communication apparatus such as a facsimile apparatus are appearing. On the other hand, there is increasing necessity to send and receive image data because of the spread of digital cameras and color printers.

In such situation, a method of efficiently performing image communication is disclosed in Japanese Patent Laid-Open No. 10-224591. The Japanese Patent Laid-Open No. 10-224591 describes that a single digital radio line is time-division-multiplexed into a low-speed radio data communication channel of 32 Kbps or so and a high-speed radio data communication channel of 400 Kbps or so, and the low-speed radio data communication channel is used when accessing a public switched line and the high-speed radio data communication channel is used when not accessing a public switched line.

Meanwhile, there are facsimile apparatuses of recent years having an image reading section (hand scanner) capable of being removed from the apparatus main body for use. In the case where the communication method disclosed in the Japanese Patent Laid-Open No. 10-224591 is applied to such a facsimile apparatus, since this method uses the single radio line, it is necessary to mount a radio processing section on the facsimile main body in order to allow a cordless telephone accommodated in the extension to access the public switched line via the facsimile apparatus by radio communication in a state where the hand scanner has come off.

Accordingly, in the above conventional communication method, there is a problem that the image reading section (hand scanner) must be set in order to send an image read by the facsimile to another terminal.

In addition, in the case of performing the high-speed radio data transmission of 400 Kbps or so by the above-mentioned conventional method, the communication is performed in the frequency hopping mode in a 2.4 GHz band. In this mode, however, there is a problem that radio interference is apt to occur since each individual channel does not occupy a specific frequency, which is different from the case of the time division multiple access (TDMA). Therefore, it is not suitable for audio communication and the like, and thus there is a problem that it is difficult to implement a cordless telephone function often used in the facsimile apparatuses of recent years.

SUMMARY OF THE INVENTION

An object of the present invention is, for the sake of solving the above problem, to allow radio communication in different modes to be used on a communication apparatus such as a facsimile apparatus so that communication can be efficiently performed.

For instance, it is intended, even in a state where the image reading section (hand scanner) is removed, to allow an image read by the facsimile apparatus to be sent to another first terminal and simultaneously radio-communicated to the public switched line by a second terminal by way of the facsimile apparatus. Also, it is intended to allow a quality cordless telephone function to be implemented by a TDMA radio line and simultaneously high-speed transmission of image data and so on to be implemented by a frequency hopping radio line. In addition, it is intended, by providing the above radio communication line connection function to both the hand scanner diffused with the facsimile apparatus and the apparatus main body, to allow the read image to be sent by facsimile, printed and sent to another terminal in the state where the hand scanner is removed from the apparatus main body.

The present invention concurrently uses a radio communication line such as TDMA of which transmission band is guaranteed to be used although its transmission speed is not fast as exemplified by PHS and so on and a radio communication line such as frequency hopping that has a possibility of interference occurring in the transmission band although its transmission speed is fast as exemplified by Bluetooth and so on.

To be more specific, an aspect of the present invention consists in the communication apparatus having means for connecting to a communication line and capable of communication with a radio terminal not via said communication line, characterized by having first means for performing radio communication in a first mode; second means for performing radio communication in a second mode; control means for exerting control, to use said first means in the case where said radio terminal communicates via said communication line, and to use said second means in the case where said radio terminal communicates with another terminal not by way of said communication line.

Another aspect of the present invention consists in a communication apparatus comprised of an apparatus main body having means for connecting to a communication line and a scanner having an image reading function and removable from said apparatus main body, wherein said scanner comprises means for selecting whether to print said read image or to communicate it to said communication line; and means for sending to said apparatus main body an instruction according to said selection results together with an image read by the scanner by radio communication, and the apparatus main body comprises means for printing a received image which received from the scanner; and means for sending the received image to the communication line.

Another aspect of the present invention consists in a communication apparatus having means for connecting to a communication line and capable of communication with a plurality of radio terminals not via said communication line, characterized by having storage means for storing information indicating whether or not each individual radio terminal is connectable to a narrow-band radio communication line and/or a wide-band radio communication line; and means for, when sending data to said radio terminal, sending the data by determining the radio communication line to be used based on information corresponding to said radio terminal as the destination stored by said storage means.

Another aspect of the present invention consists in a communication apparatus having means for connecting to a communication line and capable of communication with a radio terminal not via said communication line, characterized by having first means for performing radio communication in a first mode; second means for performing radio communication in a second mode; selection means for selecting said first means or second means according to whether or not the data to be transmitted to said radio terminal is the data received from the communication line.

Another aspect of the present invention consists in a control method of a communication apparatus having means for connecting to a communication line and capable of communication with a radio terminal not via said communication line, characterized by having first step for performing radio communication in a first mode; second step for performing radio communication in a second mode; control step for exerting control, to execute said first step in the case where said radio terminal communicates via said communication line, and to execute said second step in the case where said radio terminal communicates with another terminal not by way of said communication line.

Another aspect of the present invention consists in a control method of a communication apparatus comprised of an apparatus main body having means for connecting to a communication line and a scanner having an image reading function and removable from said apparatus main body, characterized by having selecting step for selecting, at the scanner, whether to print said read image or to communicate it to said communication line; and first sending step for sending from the scanner to said apparatus main body an instruction according to said selection results together with an image read by the scanner by radio communication, printing step for printing at the main body an image received from the scanner; and second sending step for sending the received image from the main body to the communication line.

Another aspect of the present invention consists in a control method of a communication apparatus having means for connecting to a communication line and capable of communication with a plurality of radio terminals not via said communication line, characterized by having storage step for storing information indicating whether or not each individual radio terminal is connectable to a narrow-band radio communication line and/or a wide-band radio communication line; and sending step for, when sending data to said radio terminal, sending the data by determining the radio communication line to be used based on information corresponding to said radio terminal as the destination stored by said storage step.

Another aspect of the present invention consists in a control method of a communication apparatus having means for connecting to a communication line and capable of communication with a radio terminal not via said communication line, characterized by having first step for performing radio communication in a first mode; second step for performing radio communication in a second mode; selection step for selecting said first step or second step according to whether or not the data to be transmitted to said radio terminal is the data received from the communication line.

Further objects, features and advantages of the present invention will become apparent from the following detailed description of embodiments of the present invention with reference to the accompanying drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a block diagram showing an example of configuration of the facsimile apparatus 101a and the hand scanner 102 related to a second embodiment of the present invention.

FIG. 8 is a flowchart explaining operation of the facsimile apparatus 101a in the second embodiment of the present invention.

DETAILED DESCRIPTION OF THE PREFERRED EMBODIMENTS

Preferred embodiments of the present invention will now be described in detail in accordance with the accompanying drawings.

[First Embodiment]

Figure 1:
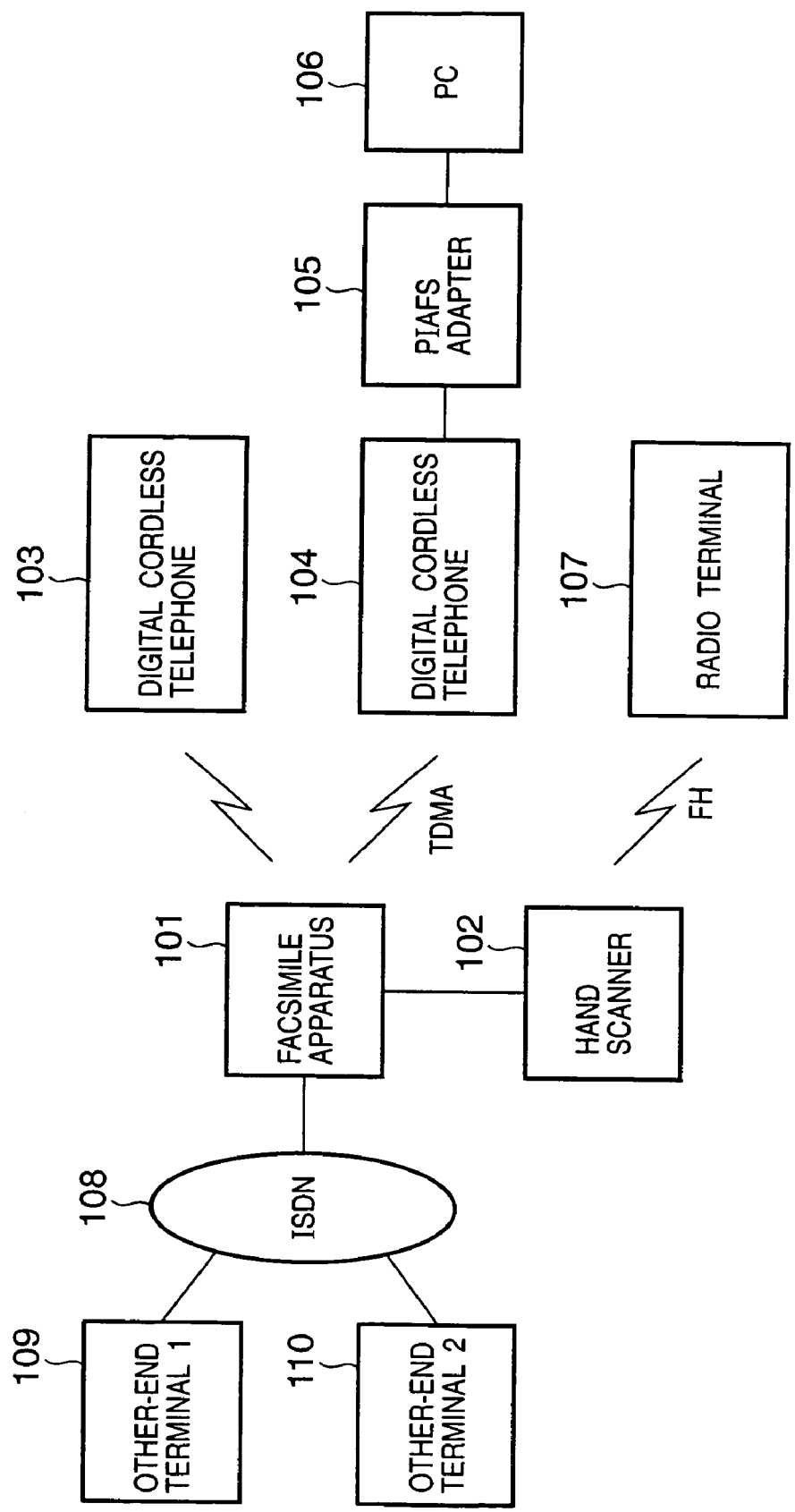
FIG. 1 is a diagram showing an example of configuration of an image communication system centering on a facsimile apparatus 101 according to a first embodiment of the present invention.

FIG. 1 is a diagram showing an example of configuration of a communication system IC1 centering on a facsimile apparatus 101 (including a hand scanner 102) as an example of a communication apparatus according to the present invention.

The image communication system IC1 has the facsimile apparatus (apparatus main body) 101, the hand scanner 102 connected in a removable manner to the facsimile apparatus 101, a first digital cordless telephone 103, a second digital cordless telephone 104, a radio data communication adapter (PIAFS (PHS Internet Access Forum Standard) card) 105, a personal computer (PC) 106, a radio terminal 107 for performing radio communication in a frequency hopping communication mode, an ISDN (Integrated Services Digital Network) 108, a first other-end terminal 109 and a second other-end terminal 110.

Figure 2:
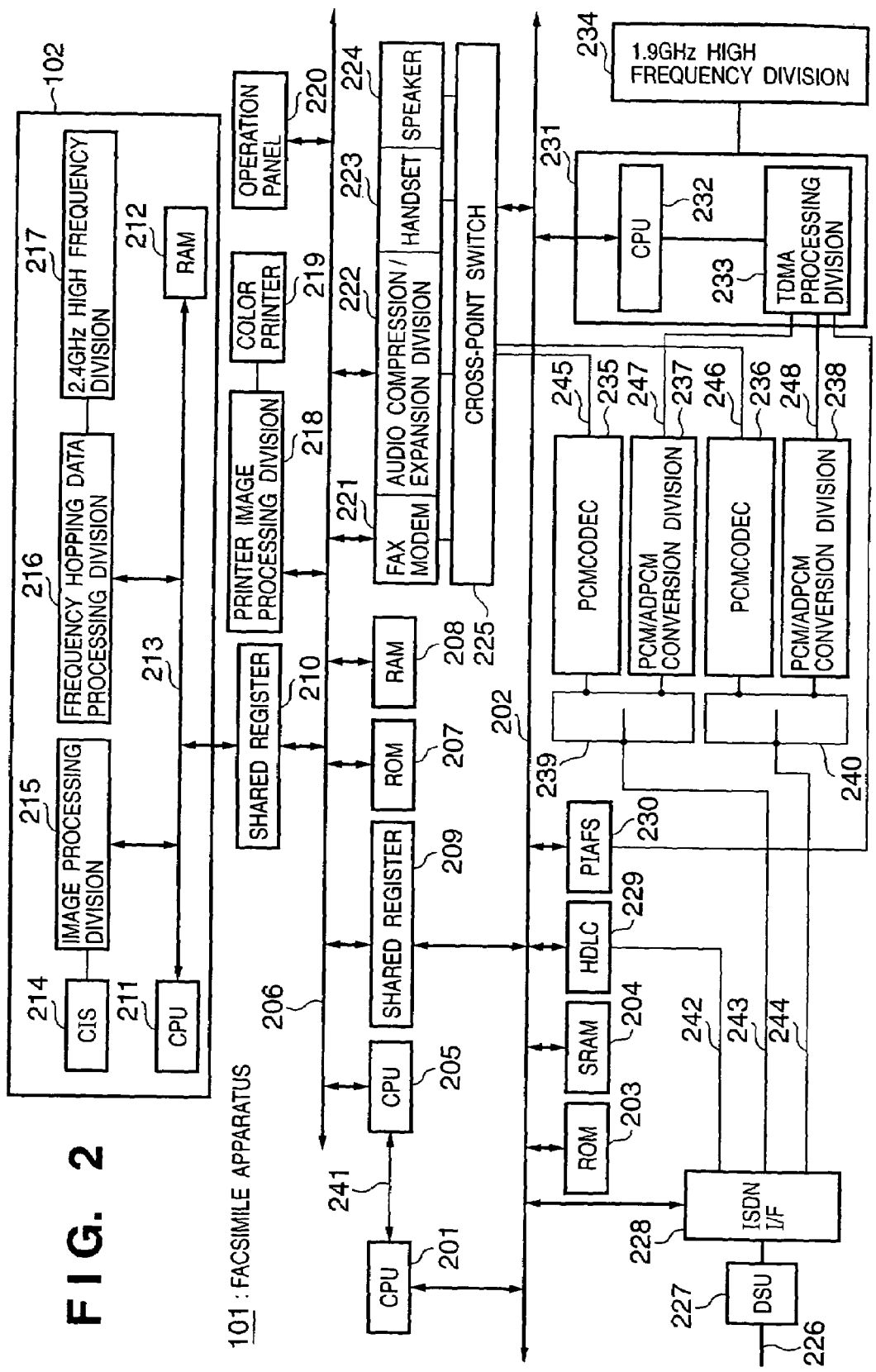
FIG. 2 is a block diagram showing an example of configuration of the facsimile apparatus 101 and a hand scanner 102 in FIG. 1.

FIG. 2 is a block diagram showing configuration of the facsimile apparatus 101 and the hand scanner 102 in FIG. 1.

The facsimile apparatus 101 has a first central control unit (CPU) 201, a data bus and an address bus 202, a ROM 203 and an SRAM 204. In addition, it has a second CPU 205, a data bus 206 of the CPU 205, a ROM 207 and a ROM 208.

The second CPU 205 has a function of JPEG-compressing/expanding digital image data by middleware.

A shared register 209 is a register for exchanging data between the CPU 201-side system and the CPU 205-side system. A shared register 210 is a register for exchanging data between the CPU 205 and the hand scanner 102.

The hand scanner 102 has a CPU 211, a RAM 212 and a data bus 213. A CIS (Contact Image Sensor) 214 for reading images contains red (R), green (G) and blue (B) LED arrays. If a read timing signal is inputted, a video signal is outputted in synchronization with the timing signal.

An image processing division 215 A/D converts the video signal outputted by the CIS 214 and then performs shading correction and gamma conversion of brightness and density so as to convert it into digital multivalued/binary data. The image data converted into digital data is stored in the RAM 212 by way of the data bus 213, and thereafter sent to the apparatus 101-side as required by way of the shared register 210. In addition, a high frequency division 217 for sending and receiving in a 2.4 GHz band is provided.

A frequency hopping data processing division 216 performs, for instance, frequency switching control in accordance with a frequency hopping communication mode compliant with the Bluetooth standards and a frame assembly/disassembly process of transmission and reception data.

The data written by the image processing division 215 by way of the data bus 213 is assembled into a predetermined frame by the frequency hopping data processing division 216, and then sent while periodically switching the frequency by the high frequency division 217. Conversely, the data received by the high frequency division 217 has a header and so on in the frame deleted by the frequency hopping data processing division 216, and a data portion of the frame is stored in the RAM 212. It is possible thereafter to send it to the facsimile apparatus 101 as required by way of the shared register 210.

The facsimile apparatus 101 is also equipped with a color printer 219. A printer image processing division 218 performs a process of converting printing data into resolution of the printer 219 (360 dpi for instance) and sends the printing data to the printer 219.

The apparatus main body 101 is also equipped with an operation panel 220, a FAX modem 221, audio compression/expansion division 222, a handset 223 and a speaker 224, and these are controlled by the CPU 205 and simultaneously connected with a cross-point switch 225. Audio or facsimile analog data is connected to the public switched line by way of the cross-point switch 225.

An ISDN line (U point) 226 and a DSU 227 convert the data exchanged with an office switchboard into a TTL-level signal. An ISDN interface division 228 controls a layer 1 to a layer 3 of the ISDN and has a data input-output function of the ISDN B channel.

An HDLC controller 229 performs an assembly/disassembly process of the data in an HDLC format.

A radio data communication protocol processing division (PIAFS controller) 230 performs a frame assembly/disassembly process of a radio data communication protocol format.

A PHS processing division 231 performs a protocol process of PHS radio communication with a CPU 232, and has four slots time-division-multiplexed by a TDMA processing division 233 to perform the frame assembly/disassembly process in sending and receiving. In addition, a high frequency division 234 for sending and receiving a 1.9 GHz-band radio wave is provided.

PCM codecs 235 and 236 perform conversion between analog signals and PCM-encoded data. PCM/ADPCM conversion divisions 237 and 238 convert ADPCM-encoded data transmitted by a PHS radio line (1.9 GHz band) into the PCM-encoded data.

Under the control of the CPU 201, bus switching switches 239 and 240 switches whether to select, as the data to be transmitted by the ISDN, the analog signal such as FAX data or the audio signal sent from the digital cordless telephone outputted from the PHS processing division 231.

Next, main signal lines in FIG. 2 will be described.

Reference numeral 241 denotes a serial communication signal line for exchanging control signals between the CPU 201 and the CPU 205.

Serial communication signal lines 242 to 244 are inputted and outputted to the ISDN interface division 228, where two of them are selected and connected to B1 and B2 channels of the ISDN line 226.

Reference numerals 245 and 246 denote analog signals to be inputted and outputted to the FAX modem 221 and the handset 223. Reference numerals 247 and 248 denote ADPCM-encoded audio data to be inputted and outputted to the digital cordless telephones 103 and 104.

Figure 3A:
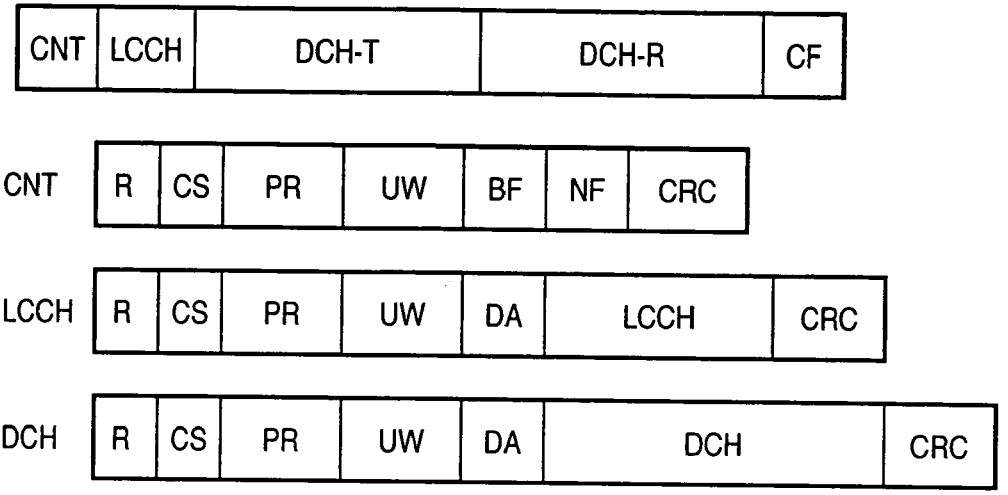
FIGS. 3A and 3B are diagrams showing a concept of a radio frame of a frequency hopping mode and a concept of a TDMA radio line frame that are usable in the present invention.
Figure 3B:
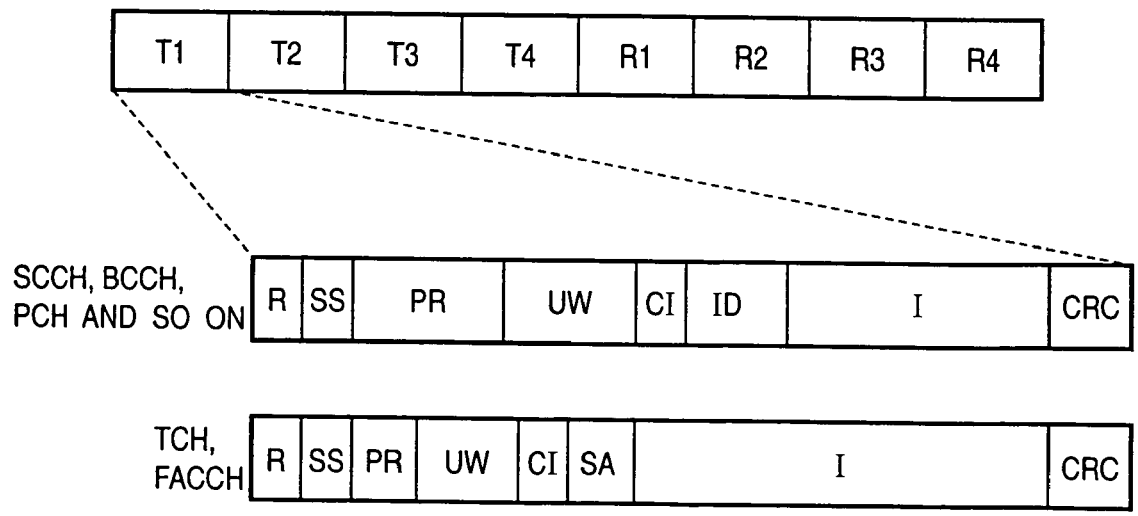

FIGS. 3A and 3B are diagrams showing a concept of a radio frame of the frequency hopping mode and a concept of a TDMA radio line frame that are used in this embodiment.

FIGS. 3A is a conceptual rendering of the radio frame of the frequency hopping mode and 3B is a conceptual rendering of the TDMA mode radio line frame.

The frame of the frequency hopping mode is, if broadly divided, comprised of a CNT field for sending hopping frequency information and so on, an LCCH field for sending and receiving outgoing/incoming control information, and a DCH-T and DCH-R fields for sending and receiving two-way data.

The CNT field is sent by a master station, and it performs a carrier sense (CS) after a ramp-up (R) in the field, and sends a preamble (PR) signal for capturing a bit cycle if the frequency to be used is vacant. Next, it sends a unique word (UW) for frame synchronization. And then, it sends frequency information of the frame (BF) and frequency information of the next frame (NF) and lastly CRC data for allowing error detection.

A slave station receives the above CNT field so as to keep the frame synchronization and perform hopping to a predetermined frequency.

Next, the LCCH field sends a request-to-send command (PAGE) to the other end and also sends a clear-to-send command (ACK) thereto.

The DCH-T and DCH-R are used for sending and receiving data between terminals of which negotiation on sending and receiving has been finished in the LCCH. They are the fields of which sections are longer than those of the CNT and the LCCH, and capable of acquiring a transmission rate of approximately 900 Kbps bidirectionally. Moreover, the LCCH and the DCH are used in common by the terminals accommodated in the system, and are not necessarily capable of continuously sending data. Sending a radio wave is allowed by the carrier sense only when no other terminal is sending a radio wave.

On the other hand, the TDMA mode frame is comprised of sending time slots T1 to T4 and receiving time slots R1 to R4, and the terminals for sending and receiving by using the TDMA mode use them in combinations of T1-R1, T2-R2, T3-R3 and T4-R4, where each pair (combination) always uses the same frequency.

A frame is divided into eight slots, and there are headers such as the preamble (PR) and the unique word (UW) for synchronous capture in each slot, and the transmission rate of a data division (I) except the headers is 32 Kbps.

Link channel establishment control, system control and so on are transmitted in frame formats of SCCH, BCCH and PCH, and information on audio/data and so on is transmitted in a TCH frame format.

Figure 4:
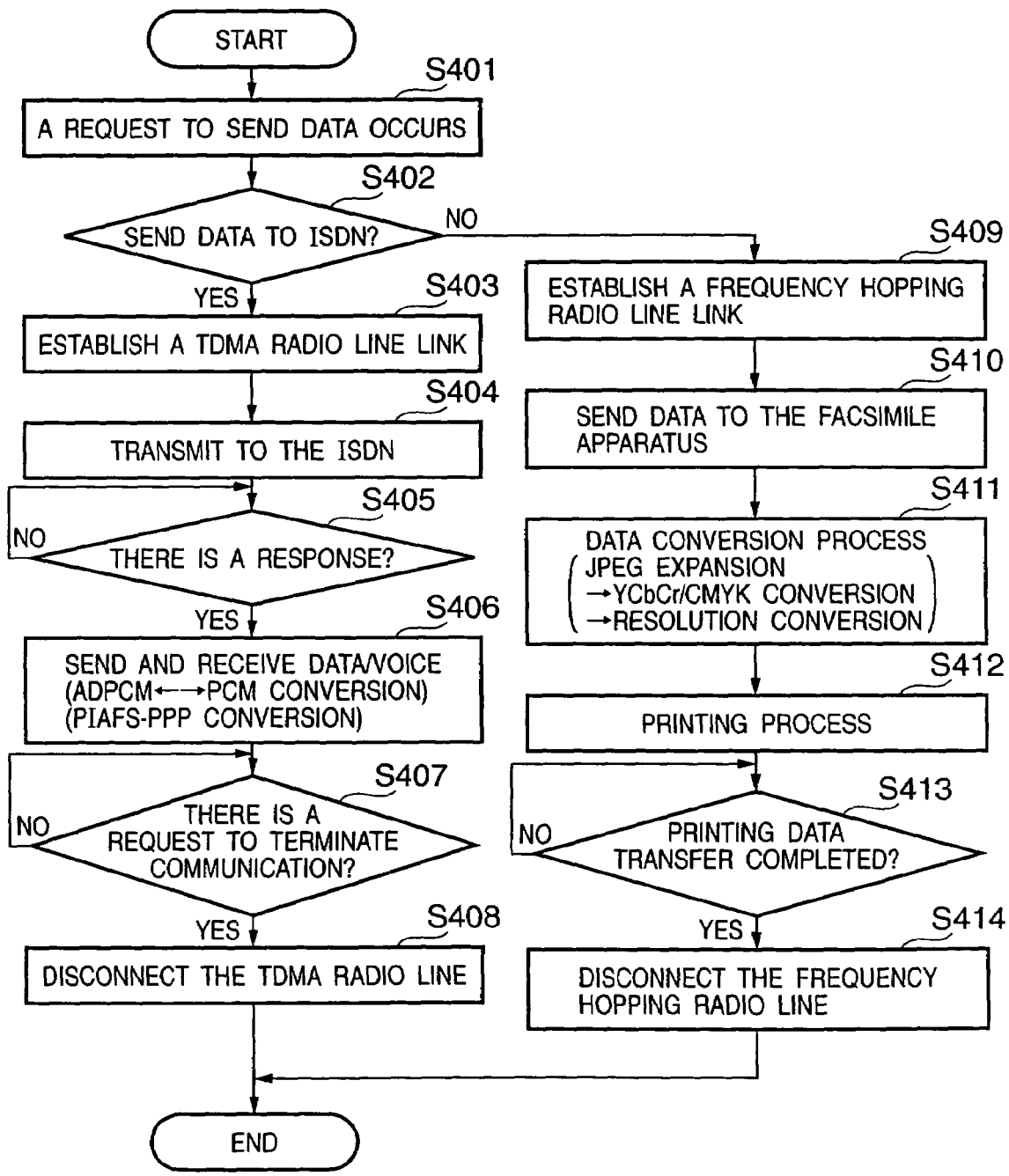
FIG. 4 is a flowchart explaining operation of the facsimile apparatus 101 in the first embodiment of the present invention.

Next, operation of the facsimile apparatus 101 and the hand scanner 102 in this embodiment will be described by using the flowcharts in FIG. 4 to FIG. 6.

Hereafter, the communication system centering on the facsimile apparatus 101 shown in FIG. 1 will be described in the following order.

[1] Audio communication in the case of using the public switched line
[2] Processing in the case where the radio terminal accesses the Internet
[3] Processing in the case where the radio terminal transmits data to the facsimile apparatus
[4] Processing in the case of sending an image read by the hand scanner to the public switched line or another radio terminal
[5] Processing in the case of incoming from the public switched line to the radio terminal

[1] Audio Communication Using the Public Switched Line

In the case of performing audio communication by way of the ISDN (S401 to S402), the transmission rate of 32 Kbps is sufficient if voice is ADPCM-encoded and transmitted, and it is not desirable that interference in the radio wave occurs for a long time. Accordingly, a TDMA channel in 1.9 GHz band is used.

If outgoing operation is performed on the digital cordless telephone 103, the digital cordless telephone 103 sends a link channel allocation request message (S403).

On receipt of the link channel allocation request message, the facsimile apparatus 101 sends the link channel allocation message and allocates the radio slots. Thereafter, it exchanges synchronous bursts and then if it receives a call setting message, it detects a destination number in the message and starts a process of transmitting to an ISDN line 226 (S404).

The CPU 201 assembles the call setting message to be sent to the ISDN, and sends it to the ISDN by way of the ISDN interface division. On receipt of a response message from the ISDN (S405), it sends the response message to the digital cordless telephones 103 and starts a call.

Thereafter, the digital cordless telephones 103 uses one of uplink TDMA radio slots to send 32 Kbps ADPCM-encoded audio data to the facsimile apparatus 101. On receipt of the ADPCM-encoded audio data,. the facsimile apparatus 101 has it converted into 64 Kbps PCM-encoded data by the ADPCM/PCM conversion division 237 and then sends it to the ISDN.

Conversely, the PCM-encoded data received from the ISDN is converted into 32 Kbps ADPCM-encoded data by the PCM/ADPCM conversion division 237. It uses one of downlink TDMA radio slots to send the converted data to the digital cordless telephones 103 (S406).

[2] Processing in the Case Where the Radio Terminal Accesses the Internet

A case where the PC 106 accesses the Internet by way of the ISDN will be described.

In this case, as it is communication by way of the ISDN (S401 to S402), the PC 106 is connected with the facsimile apparatus 101 by using the TDMA radio line.

The PC 106 activates the application software for the Internet access, and starts operation of sending data (such as e-mail data). Driver software in the PC 106 sends to the PIAFS card 105 a notice of a request to transmit, and on receiving it, the PIAFS card 105 makes the request to transmit to the digital cordless telephone 104. This request to transmit also includes telephone number information (03-1234-XXXX for instance) specified by the application software.

The digital cordless telephone 104 sends a request for link channel establishment, and on receiving it, the facsimile apparatus 101 allocates a link channel to the digital cordless telephone and establishes a 32 Kbps radio line. To be more specific, the digital cordless telephone 104 and the facsimile apparatus 101 establish the radio link by mutually sending the synchronous bursts (S403).

Next, the digital cordless telephone 104 uses an allocated slot to send the call setting message. It puts in an incoming number information element the telephone number information (03-1234-XXXX in this case) that is in the request to transmit received from the PIAFS card earlier, and then sends it.

On receiving the call setting message, the facsimile apparatus 101 reads the incoming number information element in the message and starts an ISDN transmission process (S404).

The CPU 201 provides an instruction, and accordingly the ISDN interface division 228 sends the call setting message to the ISDN. On receiving the response message from the ISDN (S405), the PHS processing division 231 sends the response message to the digital cordless telephone 104. In this stage, sending and receiving B1 channel data become possible between the PC 106 and a server terminal that is the other-end terminal 2 (110), for instance, via the ISDN.

Thereafter, the PIAFS card 105 sends and receives a PIAFS radio transmission frame at the transmission rate of 32 Kbps according to a radio data communication protocol, and establishes the radio data communication link. To be more specific, it sends a negotiation frame, establishes synchronization with the PIAFS controller 230, and then exchanges information on setting such as whether compressed or not by a communication parameter setting request frame that is a kind of a control frame.

In the meantime, on receiving the data from the digital cordless telephone 104, the facsimile apparatus 101 inputs it to the PIAFS processing division 230. The PIAFS processing division disassembles the PIAFS frame and performs a receiving process for the purpose of establishing a radio data transmission link.

Once the radio data transmission link is established, the PC 106 starts sending the data to be sent to the server terminal 110. The data outputted by the PC 106 is inputted to the facsimile apparatus 101 in a data frame format of PIAFS. On receiving the data, the facsimile apparatus 101 performs a frame disassembling process by deleting a frame identification header, an ARQ control division, an FCS division and so on of the received data frame, and stores the data in the SRAM 204 via the data bus 202.

Next, it transfers the data stored in the SRAM 204 to the HDLC controller 229, converts it into 64 Kbps synchronous data, and sends it to the ISDN by way of the ISDN interface division 228 (S406). (PIAFS-PPP conversion process)

The data received from the ISDN is transmitted in the reverse direction in the same bus as that for the transmission data, and the PC 106 is now capable of the Internet communication.

[3] Processing in the Case Where the Radio Terminal Transmits Data to the Facsimile Apparatus Operation in the case where the radio terminal 107 transmits image data to the facsimile apparatus 101 will be described.

In this case, as it does not access the ISDN (S402), the data transmission is performed by using the frequency hopping radio line.

As for the radio terminal 107, while various apparatuses can be presumed as a terminal having a radio communication function by the frequency hopping mode, this embodiment presumes a digital camera, and operation of printing by the facsimile apparatus 101 images taken by the digital camera will be described.

Once an instruction for an image printing process is provided to the digital camera 107, it starts a process of sending to the facsimile apparatus 101 JPEG-compressed image data that has been JPEG-compressed and stored in a memory in the digital camera 107.

The digital camera 107 has a data communication function by the frequency hopping radio line, and sends a request-to-send-data command to the facsimile apparatus 101 (the hand scanner 102) in the LCCH. On receiving the request-to-send-data command, the hand scanner 102 sends clear-to-send-data command to the digital camera 107 so as to establish a frequency hopping radio line link (S409).

On receiving the clear-to-send-data command, the digital camera sends the image data to be sent at the transmission rate of 450 Kbps by using a DCH field. If capacity of a compressed JPEG image is 100 Kbytes, the transmission is completed in 100×8÷450=2.2 seconds (S410).

The hand scanner 102 stores the received image data in the RAM 212 via the 2.4 GHz high frequency division 217 and the frequency hopping processing division 216.

On receiving a data transmission finish command from the digital camera 107, the CPU 211 performs a JPEG expansion process with middleware and stores it in the RAM 212 again.

Next, it issues a request to start printing to the CPU 205 of the facsimile apparatus main body 101. On receiving permission to start printing from the CPU 205, the CPU 211 of the hand scanner 102 writes the printing image data stored in the RAM 212 to the shared register 210, and the CPU 205 transfers the image data written there to the printer image processing division 218. The image processing division 218 performs color space conversion from YCbCr to CMYK, and further converts the resolution to the printing data of 360 dpi that is the resolution of the printer 219 (S411), and then transfers it to the color printer 219 so as to print it (S412).

[4] Transfer of the Image Read by the Hand Scanner

The image read by the hand scanner 102 is sent to the public switched line as FAX image data, and it can also be radio-transferred to another radio terminal.

Figure 5:
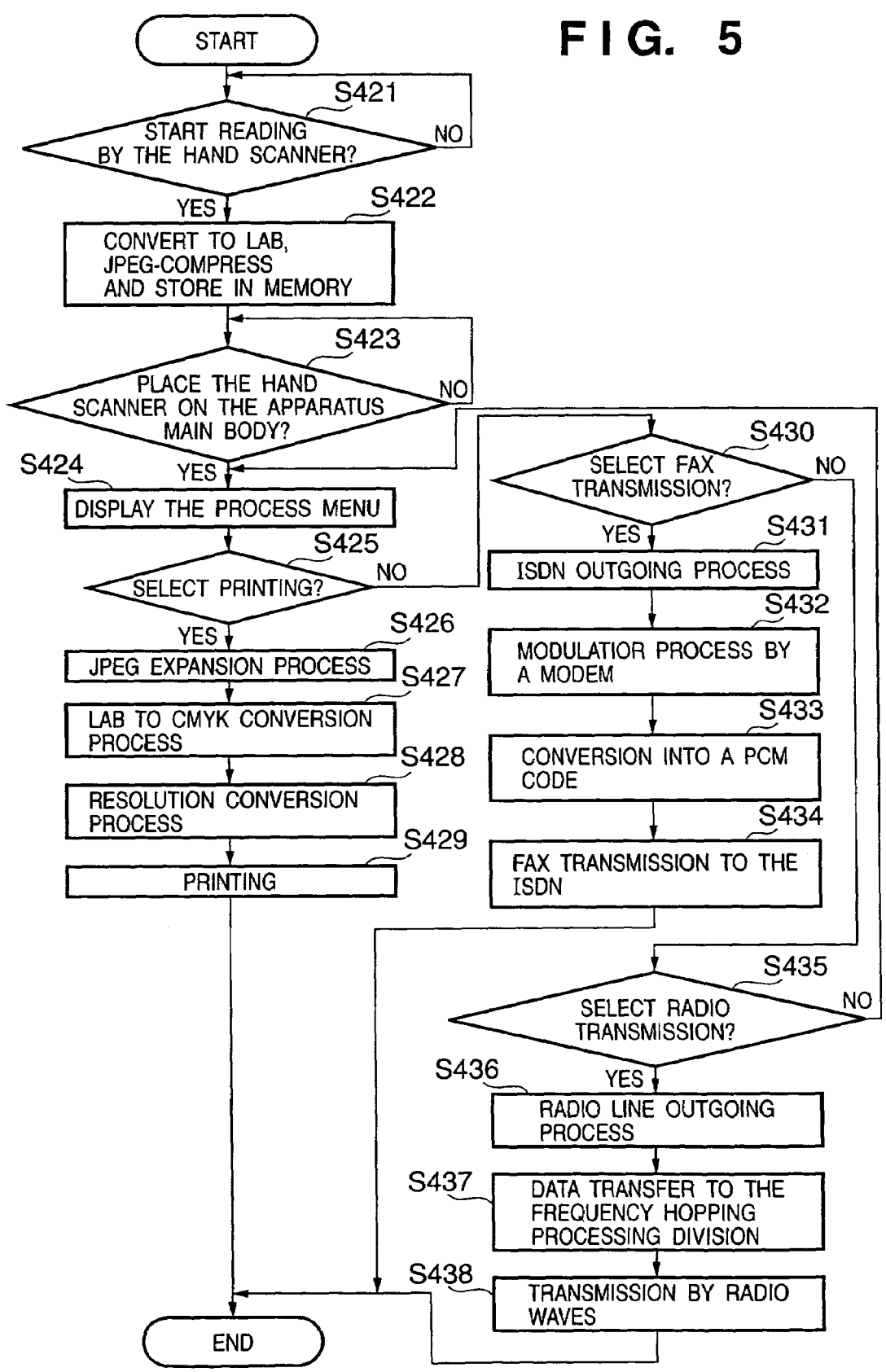
FIG. 5 is a flowchart explaining operation of the facsimile apparatus 101 in the first embodiment of the present invention.

In FIG. 5, if the hand scanner starts reading (S421), a read RGB video signal is converted from CIE to LAB color space, converted to digital data and then stored in the RAM 212. The CPU 211 JPEG-compresses the image data stored in the RAM, and then stores it again in the RAM 212 (S422).

If it finishes image reading operation by the hand scanner and detects that the hand scanner 102 is placed on the facsimile apparatus main body 101 (S423), it displays a process menu including alternatives of "Print? FAX transmission? Radio transmission?" on a display division included in the operation panel 220 of the apparatus main body 101, for instance (S424).

If "Printing" is selected by operating the operation panel 220 (S425), the JPEG image data stored in the RAM 212 of the hand scanner 102 is expanded by the middleware (S426) and transferred to the image processing division 218 of the apparatus main body 101 by way of the shared register 210. The printer image processing division 218 performs color space conversion from LAB to CMYK (S427), and then converts the resolution to the printing data of 360 dpi that is the resolution of the printer (S428) and transfers it to the color printer 219 so as to print it (S429).

In addition, if "FAX transmission" is selected (S430), it performs an ISDN outgoing process to a telephone number inputted on an input screen displayed later (S431). If there is a response from the ISDN, the JPEG image data stored in the RAM 212 is transferred to the modem 221 of the apparatus main body 101 as-is by way of the shared register 210, and the modem 221 modulates it (S432). The modulated analog signal is converted into a PCM code by the PCM codec 235 and transmitted to the ISDN (S433). If the facsimile apparatus on the other end, which is an other-end terminal 1 (100), has a JPEG expansion function, the other-end facsimile apparatus 100 can expand and print a received file.

Lastly, if "Radio transmission" is selected (S435), it does not use the public switched line for data transmission, and so the frequency hopping processing division 216 sends a data transmission command (S436) in order to transmit by using a frequency hopping radio communication line. For instance, in the case of sending the read image to the radio terminal 107, it sends the request-to-send command including an address of the radio terminal 107. On receiving the clear-to-send command from the radio terminal 107, the CPU 211 transfers the JPEG image data stored in the RAM 212 to the frequency hopping data processing division 216. The transferred data is converted into a radio wave by the 2.4 GHz high frequency division 217 and is sent to the radio terminal 107 (S437 to S438). If the radio terminal 107 has the JPEG expansion function, the radio terminal 107 can display the image read by the hand scanner 102.

[5] Processing in the Case of Incoming From the Public Switched Line to the Radio Terminal In the case where there is an incoming call from the ISDN and a specific radio terminal is designated as a sub-address, the radio communication line does not need the transmission rate of 64 Kbps or higher that is the transmission rate of the ISDN. Accordingly, it is preferable to communicate by the TDMA channel if the radio terminal is capable of it.

Thus, the facsimile apparatus 101 of this embodiment should have connected radio line type information registered in the ROM 207 for instance, showing which radio communication line a connectable radio terminal can be connected to.

Figure 6:
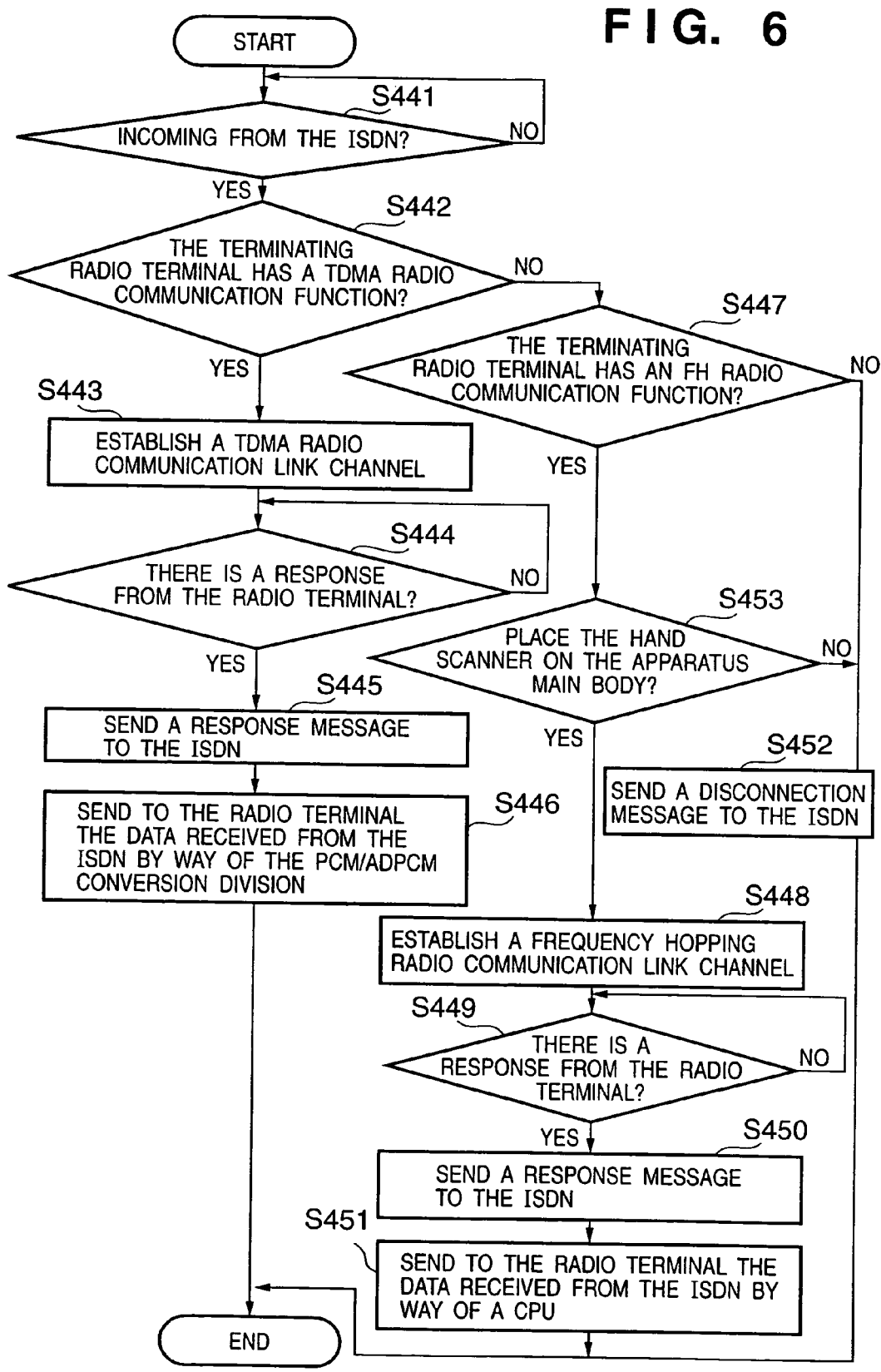
FIG. 6 is a flowchart explaining operation of the facsimile apparatus 101 in the first embodiment of the present invention.

In FIG. 6, in the case where there is an incoming call from the ISDN to the radio terminal 107 (S441), the facsimile apparatus 101 accesses the connected radio line type information of the radio terminal 107 that is registered in advance. In the case where the radio terminal 107 can use the TDMA channel (S442), an incoming notice is given to the radio terminal 107 by the TDMA channel, and on receiving a request to establish a link channel from the radio terminal 107, a link channel is allocated so that a radio line link is established (S443). On receiving a response message from the radio terminal 107 (S444), it sends the response message to the ISDN (S445).

Thereafter, any data received from the ISDN is inputted to the TDMA processing division 233 by way of the PCM/ADPCM conversion division 237, and is sent from 1.9 GHz high frequency division (S446).

On the other hand, in the case where it accesses the connected radio line type information of the radio terminal 107 and the radio terminal 107 cannot use the TDMA channel and has a frequency hopping radio communication function (S447), it checks whether or not the hand scanner 102 is placed on the facsimile apparatus main body (S453). In the case where the hand scanner 102 is placed thereon, it gives an incoming notice to the radio terminal 107 by a frequency hopping radio communication channel (S448). If it receives the response message from the radio terminal 107 (S449), it sends the response message to the ISDN (S450).

Thereafter, any data received from the ISDN is serial/parallel-converted by the ISDN interface division 228 and stored in the RAM 208 by way of the CPU 201. In the stage where a predetermined amount of the data is stored in the RAM 208, the data is transferred to the frequency hopping data processing division 216 by way of the shared register 210, and is sent from the 2.4 GHz high frequency division 217 to the radio terminal 107 (S451).

In addition, in the case where it determines in S447 that the radio terminal 107 does not have the frequency hopping radio communication function, and in the case where it determines in S453 that the hand scanner 102 is not placed on the facsimile apparatus main body, it sends a disconnection message to the ISDN so as to terminate (S452).

[Second Embodiment]

While the first embodiment is to use the hand scanner 102 and the facsimile apparatus 101 by connecting them, the second embodiment of the present invention is to provide a frequency hopping radio processing division to both the hand scanner 102 and the apparatus main body 101, whereby the read image can be easily transmitted even in a state where the hand scanner and the facsimile apparatus are not connected.

FIG. 7 is a block diagram showing the facsimile apparatus (apparatus main body) 101a (and the hand scanner 102) as an example of the communication apparatus related to the second embodiment of the present invention.

The apparatus main body 101a has the frequency hopping data processing division and the 2.4 GHz high frequency division mounted on both the hand scanner 102 side and the apparatus main body side.

Next, processing operation in the case of reading an image by the hand scanner 102 in the facsimile apparatus of this embodiment will be described by using the flowchart in FIG. 8.

First, if the hand scanner 102 starts reading the image (S601), the read RGB video signal is converted from CIE to LAB color space by the middleware of a CPU 211S, JPEG-compressed and then stored in an RAM 212S (S602).

Next, if the keys of the numbers "1," "0" and "7" indicating the radio terminal 107 and "Send" are pressed in order on the hand scanner panel (S603), the CPU 211S having recognized the pressed keys uses a frequency hopping data processing division 216S to send a request-to-send-data command to the radio terminal 107 (S604). On receiving a clear-to-send-data command from the radio terminal 107, it transfers the JPEG-compressed image data stored in a RAM 212S to the frequency hopping data processing division 216S (S605) and sends it to the radio terminal 107 by way of the 2.4 GHz high frequency division 217S (S606).

In addition, if the keys of the numbers "1," "0" and "1" indicating the facsimile apparatus 101a and "Send" are pressed in order on the hand scanner panel (S607), the CPU 211S having recognized the pressed keys uses the frequency hopping data processing division 216S to send a request-to-send-data command to the facsimile apparatus 101a (S608). On receiving a clear-to-send-data command from the facsimile apparatus 101a, it transfers the JPEG-compressed image data stored in the RAM 212S to the frequency hopping data processing division 216S and sends it to the facsimile apparatus 101a by way of the 2.4 GHz high frequency division 217S (S609). The facsimile apparatus 101a stores in the RAM 212 the image data received via the 2.4 GHz high frequency division 217 and the frequency hopping data processing division 216, and displays in the display division of the operation panel 220 a process selection menu of "Image data reception completed. Printing? FAX transmission?" for instance (S611).

If "Printing" is selected (S612), the JPEG image data stored in the RAM 212 is expanded by the middleware of the CPU 211 (S613) and transferred to the printer image processing division 218 by way of the shared register 210. The printer image processing division 218 performs conversion from LAB to CMYK (S614), and further converts the resolution to the printing data of 360 dpi that is the resolution of the printer 219 (S615), and then transfers it to the color printer 219 so as to print it (S616).

If "FAX transmission" is selected (S617), it performs an ISDN outgoing process to a telephone number inputted from an unillustrated input screen later (S618). If there is a response from the ISDN, the JPEG compressed image data stored in the RAM 212 is transferred to the modem 221 and the modem 221 modulates it (S619). The PCM codec 235 converts the above modulated analog signal into a PCM code (S620) and transmit it to the ISDN (S621). If the facsimile apparatus on the other end has a JPEG expansion function, the other-end facsimile apparatus can expand and print the received file.

Moreover, this embodiment describes the case where, if the image data is sent to the facsimile apparatus 101a, it is selected on the facsimile apparatus 101a whether to print it or send it by FAX. However, it is also possible to make the operation on the apparatus main body 101a no longer necessary by providing selection means to the hand scanner 102.

In this case, for instance, if "Printing" is selected by pressing a key on the hand scanner 102 after reading the image therewith, a request-to-print command is sent to the facsimile apparatus 101a in advance of sending the image data, and the image data transmitted thereafter will be processed as printing data (S613 to S616).

In addition, if "FAX transmission" is selected, a FAX transmission command is sent to the facsimile apparatus 101a in advance of sending the image data, and the image data transmitted thereafter will be processed as FAX transmission data (S618 to S621).

To be more specific, the above embodiment provides means for using a narrow-band radio communication line for sending and receiving to and from another terminal the data transmission to be sent and received to and from the public switched line and means for using a wide-band radio communication line for sending and receiving to and from another terminal the data transmission not to be sent or received to and from the public switched line, whereby quality audio communication with no interference is implemented by a time division multiplexing system for a cordless telephone and so on in the case of accessing the public switched line. At the same time, in the case of sending printing data to the facsimile apparatus and sending the image data read by the facsimile apparatus to a PC, it implements high-speed transmission by the frequency hopping mode. Thus, it allows an optimum radio line to be selected according to the data type.

In addition, the above embodiment provides means for transmitting the image data by way of the apparatus main body in the case of sending the image read by the hand scanner to the public switched line and means for transmitting the image data by connecting the hand scanner to the terminal directly by a radio communication line in the case of sending the image read by the hand scanner to another terminal, where the image data can be easily captured in radio transmission to the PC and so on with the scanner for reading facsimile images.

Furthermore, in the above embodiment, the above scanner and the apparatus main body have means for connecting to the radio communication line, and it provides means for transmitting the image data by the radio communication line in the case of sending the image read by the scanner to the public switched line and in the case of sending it to another terminal, whereby facsimile transmission and image data transmission to the PC and so on can be easily performed even if the scanner is removed.

In addition, the above embodiment provides means for printing the image data received by the apparatus main body, means for sending the image data received by the apparatus main body to the public switched line, and means for, in accordance with the image data transmission from the scanner, sending an instruction according to the above selection results from the scanner to the apparatus main body, where it is selected by the scanner whether to print the image data or to transmit it to the public switched line so that the read image can be transmitted by FAX or printed without connecting the scanner to the apparatus main body.

Furthermore, the above embodiment provides means for storing whether the radio terminal to be accommodated in an extension is connectable to the narrow-band radio communication line or to the wide-band radio communication line, and means for, in the case where it is necessary to send the data to an extension terminal, using the stored connectable radio communication line to send the data, whereby the optimum radio communication line can be used according to the other party of communication.

Moreover, the above embodiment provides means for using a time-division-multiplexed narrow-band radio communication line for transmitting to another terminal in the case where the data to be transmitted is the data received from the public switched line, and means for using a wide-band radio communication line for transmitting to another terminal in the case where the data to be transmitted is not the data received from the public switched line, whereby high-speed transmission radio line is not occupied in the case of communication by way of the public switched line not requiring high-speed transmission.

Furthermore, although only digital radio communication protocols are described in the above embodiments, an analogue radio communication protocol also applicable to apparatuses of the invention.

The present invention concurrently uses a radio communication line such as TDMA of which transmission band is guaranteed to be used although its transmission speed is not fast as exemplified by PHS and so on and a different radio communication line such as the frequency hopping that has a possibility of interference occurring in the transmission band although its transmission speed is fast as exemplified by Bluetooth and so on, so that the communication can be efficiently performed. Accordingly, even in a state where the image reading section (hand scanner) is removed, for instance, it allows the image read by the facsimile apparatus to be sent to another first terminal and simultaneously radio-communicated to the public switched line by a second terminal by way of the facsimile apparatus. Also, it allows a quality cordless telephone function to be implemented by the TDMA radio line and simultaneously high-speed transmission of image data and so on to be implemented by the frequency hopping radio line. In addition, it is possible, by providing the above radio communication line connection function to both the hand scanner diffused with the facsimile apparatus and the apparatus main body, to allow the read image to be sent by facsimile, printed and sent to another terminal in the state where the hand scanner is removed from the apparatus main body.

Furthermore, the present invention can be applied to the system comprising either a plurality of units or a single unit. It is needless to say that the present invention can be applied to the case which can be attained by supplying programs which execute the process defined by the present system or invention.

The present invention is not limited to the above embodiments and various changes and modifications can be made within the spirit and scope of the present invention. Therefore, to apprise the public of the scope of the present invention the following claims are made.

What is claimed is:

1. A communication apparatus having a connecting unit adapted to connect to a communication line and adapted for radio communication with a radio terminal not via said communication line, said apparatus comprising:
   a main body having said connecting unit and a first radio communication unit adapted to perform radio communication using a first radio communication method;
   a scanner, which is removable from said main body, having an image-reading function and a second radio communication unit adapted to perform radio communication using a second radio communication method different from said first radio communication method;
   a selecting unit adapted to select the first radio communication method, performed by said first radio communication unit, or the second radio communication method, performed by said second radio communication unit, based on a destination address of data received from said communication line; and
   a transfer unit adapted to transfer said data received from said communication line to said scanner in case that said second radio communication method is selected by said selecting unit in order to send said data received from said communication line to the destination address thereof.

2. The communication apparatus according to claim 1, wherein said first radio communication unit communicates by a time division multiplex communication method, and said second radio communication unit communicates by a frequency hopping method.

3. A control method for use in a communication apparatus including a main body having a connecting unit adapted to connect to a communication line and adapted for radio communication with a radio terminal not via said communication line and a scanner, which is removable from the main body, having an image-reading function, comprising:
   a first radio communication step of performing radio communication in a first radio communication method;
   a second radio communication step of performing radio communication in a second radio communication method different from said first radio communication method;
   a selecting step of selecting between (1) performing the first radio communication method of said first communication step and (2) performing the second radio communication method of said second radio communication step, based on a destination address of data received from the communication line; and a transfer step of transferring the data received from the communication line to the scanner in case that said second radio communication method is selected in said selecting step in order to send the data received from the communication line to the destination address thereof.

* * * * *

UNITED STATES PATENT AND TRADEMARK OFFICE
CERTIFICATE OF CORRECTION

| | | |
|---|---|---|
| PATENT NO. | : 7,110,791 B2 | Page 1 of 1 |
| APPLICATION NO. | : 11/030070 | |
| DATED | : September 19, 2006 | |
| INVENTOR(S) | : Michihiro Izumi | |

It is certified that error appears in the above-identified patent and that said Letters Patent is hereby corrected as shown below:

COLUMN 10:

Line 9, "(S43l)" should read --(S431)--.

Signed and Sealed this

Nineteenth Day of June, 2007

JON W. DUDAS
*Director of the United States Patent and Trademark Office*